United States Patent
Sato et al.

(10) Patent No.: US 11,034,110 B2
(45) Date of Patent: Jun. 15, 2021

(54) CONVEYOR BELT

(71) Applicant: NITTA CORPORATION, Osaka (JP)

(72) Inventors: Yuki Sato, Yamatokoriyama (JP); Kensuke Saito, Yamatokoriyama (JP); Masafumi Jouo, Tokyo (JP); Koki Morimoto, Yamatokoriyama (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 16/957,904

(22) PCT Filed: Dec. 25, 2018

(86) PCT No.: PCT/JP2018/047524
§ 371 (c)(1),
(2) Date: Jun. 25, 2020

(87) PCT Pub. No.: WO2019/131612
PCT Pub. Date: Jul. 4, 2019

(65) Prior Publication Data
US 2021/0129469 A1    May 6, 2021

(30) Foreign Application Priority Data

Dec. 27, 2017 (JP) .............................. JP2017-252044

(51) Int. Cl.
 *B29D 29/06* (2006.01)
 *B65G 15/34* (2006.01)
 *B65G 15/42* (2006.01)

(52) U.S. Cl.
 CPC ............. *B29D 29/06* (2013.01); *B65G 15/34* (2013.01); *B32B 2433/02* (2013.01); *B65G 15/42* (2013.01)

(58) Field of Classification Search
 CPC ......... B65G 15/34; B65G 15/42; B29D 29/06
 (Continued)

(56) References Cited

U.S. PATENT DOCUMENTS 7,267,219 B2 * 9/2007 Vogt ...................... B65G 15/34
 198/844.1
8,286,786 B1 * 10/2012 Saxena ................... B32B 5/024
 198/844.1
(Continued)

FOREIGN PATENT DOCUMENTS

JP  S60-170337 U  11/1985
JP  H03118913 U  12/1991
(Continued)

*Primary Examiner* — James R Bidwell
(74) *Attorney, Agent, or Firm* — Muncy, Geissler, Olds & Lowe, P.C.

(57) ABSTRACT

Provided is a conveyor belt that has sufficient stretchability and elasticity, and sufficient strength, and is capable of reliably conveying an object to be conveyed even in inclined conveyance. The conveyor belt includes: a stretchable knitted fabric 15; an elastic layer 14 that is provided on an upper surface of the knitted fabric 15 and is made of a first thermoplastic material; and a surface resin layer 20 that is provided on an upper surface of the elastic layer 14, is made of a second thermoplastic material having hardness lower than hardness of the first thermoplastic material, and the surface resin layer 20 includes a conveying surface 21 having unevenness. Tensile strength of the conveyor belt is 3.5 to 35 MPa, and a coefficient of static friction of the conveying surface 21 is 0.5 to 1.0.

5 Claims, 1 Drawing Sheet

(58) Field of Classification Search
USPC .......................................................... 198/847
See application file for complete search history.

(56) References Cited

U.S. PATENT DOCUMENTS

| | | | | |
|---|---|---|---|---|
| 8,701,866 | B2 * | 4/2014 | Olszak ................... | B65G 35/06 |
| | | | | 198/465.1 |
| 9,321,592 | B2 * | 4/2016 | Tajima ..................... | F16G 1/10 |
| 2006/0234820 | A1 * | 10/2006 | Yamamoto ................ | F16G 1/16 |
| | | | | 474/266 |
| 2015/0291359 | A1 * | 10/2015 | Tajima ..................... | F16G 1/28 |
| | | | | 198/689.1 |
| 2016/0137421 | A1 * | 5/2016 | Josserond ............. | B29C 44/505 |
| | | | | 474/139 |
| 2016/0362252 | A1 * | 12/2016 | Kim ....................... | B32B 25/00 |

FOREIGN PATENT DOCUMENTS

| | | |
|---|---|---|
| JP | H04-209115 A | 7/1992 |
| JP | H7-31719 U | 6/1995 |
| JP | 2506416 Y2 | 8/1996 |
| JP | 2000016547 A | 1/2000 |
| JP | 2000247477 A | 9/2000 |
| JP | 2000351429 A | 12/2000 |
| JP | 2001153186 A | 6/2001 |
| JP | 2002068653 A | 3/2002 |
| JP | 2006-290601 A | 10/2006 |
| JP | 2014088243 A | 5/2014 |

* cited by examiner

CONVEYOR BELT

TECHNICAL FIELD

The present invention relates to a conveyor belt.

BACKGROUND ART

Conveyor belts are used to convey various articles such as foods, metal parts, household goods, and precision machines. There is suggested a belt in which a thermoplastic synthetic resin layer is provided on both surfaces of a base part of plain weave, and the surfaces are set to a predetermined state to enhance a sliding property (for example, refer to PTL 1). In the belt described in PTL 1, a spherical substance is mixed in a thermoplastic synthetic resin, and a part thereof is made to protrude from the surface of the thermoplastic synthetic resin layer, thereby enhancing the sliding property.

In addition, there is suggested a conveyor belt in which a cover layer made of a high-adhesiveness thermoplastic resin is provided so that various objects to be conveyed such as foods and plastic containers can be conveyed at a steep inclination (for example, refer to PTL 2). In the belt described in PTL 2, the adhesiveness of the cover layer is enhanced by adding a plasticizer to polyurethane (PU) or polyvinyl chloride (PVC), thereby securing a high friction force.

CITATION LIST

Patent Literature

PTL 1: Japanese registered Utility Model No. 2,506,416
PTL 2: JP-UM-A-H3-118913

SUMMARY OF THE INVENTION

Technical Problem

A belt (elastic belt) having stretchability due to knitted fabric and elasticity due to an elastic layer has sufficient strength, and can be used as an endless belt without using a tension mechanism. The larger a coefficient of friction between a conveying surface of a belt and an object to be conveyed, the more reliably convey the object to be conveyed even in inclined conveyance. When increasing the coefficient of friction of the conveying surface of the belt, hardness of the elastic layer decreases, and this leads to a decrease in belt strength.

In this regard, an object of the invention is to provide a conveyor belt that has sufficient stretchability and elasticity, and sufficient strength, and is capable of reliably conveying an object to be conveyed even in inclined conveyance.

Solution to Problem

According to an aspect of the invention, there is provided a conveyor belt including: a stretchable knitted fabric; an elastic layer that is provided on an upper surface of the knitted fabric and is made of a first thermoplastic material; and a surface resin layer that is provided on an upper surface of the elastic layer, is made of a second thermoplastic material having hardness lower than hardness of the first thermoplastic material, and the surface resin layer includes a conveying surface having unevenness. Tensile strength of the conveyor belt is 3.5 to 35 MPa, and a coefficient of static friction of the conveying surface is 0.5 to 1.0.

Advantageous Effects of the Invention

The conveyor belt of the invention includes the elastic layer that is laminated on the stretchable knitted fabric and is made of a thermoplastic material, and thus the tensile strength of the conveyor belt is 3.5 to 35 MPa, and has sufficient strength. The surface resin layer provided on the upper surface of the elastic layer is made of a thermoplastic material having hardness lower than that of the elastic layer, and the surface resin layer includes the conveying surface having unevenness. According to this, the coefficient of static friction of the conveying surface is defined to 0.5 to 1.0, and thus the conveyor belt of the invention can reliably convey an object to be conveyed even in inclined conveyance.

DESCRIPTION OF EMBODIMENTS

Hereinafter, an embodiment of the invention will be described in detail with reference to the accompanying drawings.

1. Overall Configuration

Figure 1:
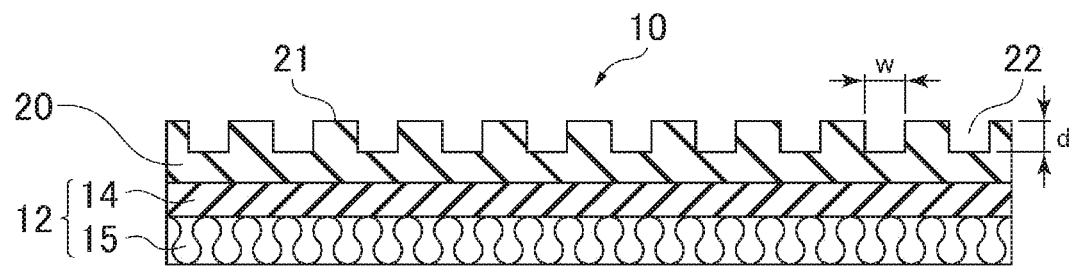
FIG. 1 is a cross-sectional view of a conveyor belt according to an embodiment in a width direction.

A conveyor belt 10 illustrated in FIG. 1 includes a core body layer 12, and a surface resin layer 20 provided on a surface of the core body layer 12. The core body layer 12 has a laminated structure including a stretchable knitted fabric 15, and an elastic layer 14 that is provided on the knitted fabric 15 and is made of a first thermoplastic material. The surface resin layer 20 is made of a second thermoplastic material having hardness lower than that of the first thermoplastic material, and the surface resin layer 20 includes a conveying surface 21 having unevenness including a plurality of vertical grooves 22.

<Knitted Fabric>

The knitted fabric 15 imparts stretchability to the conveyor belt 10. The knitted fabric 15 is not particularly limited as long as the knitted fabric 15 is obtained by knitting fibers. A knitted fabric that is typically used in an elastic belt can be used as the knitted fabric 15 in the conveyor belt 10. A method of knitting the knitted fabric 15 may be either wrap knitting or weft knitting. Fibers forming the knitted fabric 15 can be selected, for example, from a polyester fiber, a nylon fiber, an aramid fiber, a glass fiber, and a cotton yarn, and the like. The fibers used in the knitted fabric 15 may be used alone or may include two or more different kinds.

The thickness of the fibers forming the knitted fabric 15 is not particularly limited, and is approximately 20 to 280 T (decitex) as an example. It is preferable that the thickness of the knitted fabric 15 is approximately 0.3 to 0.8 mm, and more preferably approximately 0.4 to 0.6 mm.

<Elastic Layer>

The elastic layer 14 is made of the first thermoplastic material, and imparts flexibility and strength to the conveyor belt 10. Examples of the first thermoplastic material include thermoplastic elastomers made of polyurethane, polyolefin such as polyethylene/polypropylene, and polyester. The polyurethane elastomers are particularly preferable from the viewpoint of excellent processability and high strength. It is preferable that the thickness of the elastic layer 14 is approximately 0.2 to 1.5 mm, and more preferably approximately 0.3 to 0.8 mm <Surface Resin Layer>

The surface resin layer 20 is constituted by the second thermoplastic material having hardness lower than that of the first thermoplastic material. In addition, the surface resin layer 20 has unevenness in the conveying surface 21. Since the surface resin layer 20 is constituted by the thermoplastic material, the surface resin layer 20 has excellent abrasion resistance. For example, the second thermoplastic material may be a mixture of the first thermoplastic material and an additive to be described later. It is preferable that the thickness of the surface resin layer 20 is approximately 0.2 to 1.5 mm, and more preferably approximately 0.3 to 0.8 mm. The thickness of the surface resin layer 20 represents a maximum thickness in a convex part of the unevenness.

The unevenness of the conveying surface 21 in this embodiment includes the plurality of vertical grooves 22 along a longitudinal direction of the surface resin layer 20. In the vertical grooves 22, a width w is approximately 0.5 to 3.0 mm, and a depth d is approximately 0.2 to 1.0 mm. The vertical grooves 22 are provided at the entire region of the conveying surface 21 in a width direction of the surface resin layer 20, and thus the unevenness exists at the entire region of the conveying surface 21.

Tensile strength of the surface resin layer 20 is 3.5 to 8 MPa. When the tensile strength of the surface resin layer 20 is 3.5 MPa or more, the conveyor belt 10 can be used in a typical conveyance use without any problem. The tensile strength of the conveyor belt 10 is defined to 3.5 to 35 MPa in consideration of a highly stretchable characteristic of the belt. Since the conveyor belt 10 includes the stretchable knitted fabric and the elastic layer 14 made of the thermoplastic material as described above, a predetermined range of tensile strength is secured. It is preferable that the tensile strength of the conveyor belt 10 is 10 MPa or more, and more preferably 20 MPa or more.

In addition, in the conveyor belt 10, a coefficient of static friction of the conveying surface 21 of the surface resin layer 20 is 0.5 to 1.0. Since the surface resin layer 20 is constituted by a predetermined second thermoplastic material and the unevenness is provided in the conveying surface 21, the coefficient of static friction in a predetermined range is secured. When the coefficient of static friction of the conveying surface 21 is 0.5 or more, it is possible to reliably convey an object to be conveyed even in a case where the conveyor belt 10 is provided at an inclination. In the conveyor belt 10, the upper limit of the coefficient of static friction is defined to 1.0 in consideration of a characteristic of a high coefficient of friction for article conveyance. It is preferable that the coefficient of static friction is 0.6 or more, and more preferably 0.7 or more. A method for obtaining the tensile strength and the coefficient of static friction will be described in detail later.

2. Manufacturing Method

The conveyor belt 10 can be manufactured by an arbitrary method as long as the knitted fabric 15 and the elastic layer 14 are fixed to each other, and the elastic layer 14 and the surface resin layer 20 are fixed to each other, and thus peeling-off does not occur.

First, a thermoplastic sheet serving as the elastic layer 14 is prepared by using a predetermined thermoplastic elastomer with a calendar device or an extrusion device. The size of the sheet is adjusted to the size of the stretchable knitted fabric 15. The sheet can be fixed to the knitted fabric 15 by using rubber paste.

The stretchable knitted fabric 15 is impregnated with the rubber paste in advance. The rubber paste can be impregnated into the knitted fabric 15 by using an application unit such as a coater and a brush. Alternatively, the knitted fabric 15 may be immersed in the rubber paste to impregnate the knitted fabric 15 with the rubber paste.

The elastic layer 14 is placed on the knitted fabric 15 impregnated with the rubber paste, and both the elastic layer 14 and the knitted fabric 15 are fixed to each other under a heating and pressurizing condition. In this manner, the core body layer 12 in which the elastic layer 14 made of the first thermoplastic material is laminated on the stretchable knitted fabric 15 is obtained. The core body layer 12 contributes to the tensile strength of the conveyor belt 10. The tensile strength can be changed in a range of 3.5 to 35 MPa by adjusting a ratio between the elastic layer 14 and the knitted fabric 15 in the core body layer 12. For example, as the ratio of the elastic layer 14 increases, the tensile strength tends to increase.

On the other hand, the surface resin layer 20 made of the second thermoplastic material is prepared by using a predetermined raw material composition. For example, the raw material composition can be prepared by mixing an ether-based thermoplastic polyurethane elastomer (hereinafter, referred to as "ether-based TPU") as the first thermoplastic material, a hydrogenated styrene-based thermoplastic elastomer (hereinafter, referred to as "styrene-based TPE) as an additive, a compatibilizer and wax. When using the raw material composition, the second thermoplastic material having hardness lower than that of the first thermoplastic material is obtained.

For example, ratios of respective components in the raw material composition can be set as follows.

Ether-based TPU: 50% by mass to 60% by mass
Styrene-based TPE: 10% by mass to 30% by mass
Compatibilizer: 0% by mass to 10% by mass
Wax: 5% by mass to 15% by mass
Calcium carbonate: 0% by mass to 25% by mass An arbitrary component may be blended as necessary to prepare the raw material composition.

As the ether-based TPU, for example, an ether-based thermoplastic urethane resin having hardness equivalent to measured by a type A durometer in accordance with Japanese Industrial Standard JIS K6253 can be used. As the compatibilizer, a mixture of a hydrogenated styrene-based elastomer and a thermoplastic urethane resin can be used. As the wax, a commercially available solid paraffin oil can be used.

A resin sheet serving as the surface resin layer 20 is prepared by using the raw material composition prepared by blending respective components in a predetermined ratio with a calendar device. That is, two rolls disposed at a predetermined interval are rotated in the same direction while flowing the raw material composition in a molten state between the two rolls to obtain a band-shaped resin sheet. At this time, one roll is set to a roll having a smooth surface, and the other roll is set to a roll including convex parts corresponding to the vertical grooves, thereby a resin sheet including the vertical grooves is obtained. The size of the resin sheet is adjusted to the size of the stretchable knitted fabric 15.

The obtained resin sheet is disposed on the elastic layer 14 in the core body layer 12 prepared in advance to obtain a laminated body. The laminated body is laminated during extrusion, or is heated and compressed after sheet formation to be processed into a predetermined thickness. For example, the thickness of the laminated body after heating and compression can be set to approximately 1.0 to 3.0 mm. When performing the heating and compression, the elastic layer 14 and the surface resin layer 20 in the core body layer 12 are fixed to each other.

As described above, the conveyor belt 10 according to this embodiment in which the surface resin layer 20 is laminated on the core body layer 12 including the knitted fabric 15 and the elastic layer 14 is obtained. The conveyor belt 10 can be applied to an inclined conveyor or the like by joining both end parts by a finger joint to be processed into an endless shape.

The coefficient of static friction of the conveying surface 21 of the surface resin layer 20 depends on the hardness of the second thermoplastic material that constitutes the surface resin layer 20. It is possible to change the coefficient of static friction of the conveying surface 21 in a range of 0.5 to 1.0 by adjusting a blending ratio of respective components in the raw material composition. For example, in the raw material composition, as the ratio of the styrene-based TPE to the ether-based TPU is larger, the coefficient of static friction increases.

Alternatively, it is also possible to change the coefficient of static friction of the conveying surface 21 by adjusting dimensions (the width w and the depth d) of the vertical grooves 22 provided in the conveying surface 21 of the surface resin layer 20. For example, as the width w or the depth d of the vertical grooves 22 is larger, dust or dirt is less likely to be accumulated on the surface of the conveying surface 21, and thus the coefficient of static friction increases.

3. Operation and Effect

The conveyor belt 10 according to this embodiment includes the stretchable knitted fabric 15 and the elastic layer 14 that is provided on the knitted fabric 15 and is made of a thermoplastic material. Since the conveyor belt 10 has stretchability, the conveyor belt 10 can be used as an endless belt without using a tension mechanism. Furthermore, since the conveyor belt 10 includes the knitted fabric 15 and the elastic layer 14, the conveyor belt 10 has sufficient strength and the tensile strength thereof is 3.5 to 35 MPa.

The surface resin layer 20 provided on the elastic layer 14 includes the conveying surface 21 that is constituted by a thermoplastic material having hardness lower than that of the elastic layer 14, and has unevenness. As is typically known, in the thermoplastic material, when the hardness decreases, the coefficient of friction increases. Accordingly, the conveying surface 21 of the surface resin layer 20 has a coefficient of static friction larger than that of the surface of the elastic layer 14. The conveying surface 21 has the coefficient of static friction in a range of 0.5 to 1.0. The conveyor belt 10 according to this embodiment can reliably convey an object to be conveyed even in inclined conveyance, and sufficient abrasion resistance is also provided.

The conveyor belt 10 can be appropriately used for an inclined conveyor or a gap adjustment conveyor. In this case, the object to be conveyed can be moved in an upper and lower direction while being moved in a horizontal direction, and thus this leads to space saving of an installation location or a working region. In addition, an object to be conveyed (for example, a small-sized object to be conveyed, or the like), which is difficult to be stably conveyed in a case where the conveyor belt 10 is provided to cover rollers in a roller conveyor, can be stably conveyed.

4. Examples

Hereinafter, the conveyor belt of the invention will be described in detail with reference to specific examples, but the invention is not limited to the following specific examples.

Example

First, a urethane rubber sheet (thickness: 0.3 mm) was prepared by using the ether-based TPU with an extrusion device. The urethane rubber sheet serves as an elastic layer of the conveyor belt.

A stretchable knitted fabric was applied with rubber paste (application amount: 5 g/m$^2$). The knitted fabric applied with the rubber paste and the ether-based TPU were compressed during extrusion molding to fix both the knitted fabric and the ether-based TPU, thereby obtaining a core body layer.

The following components were blended in the following prescription to prepare the raw material composition of the surface resin layer.

Ether-based TPU (hardness: 80°): 65% by mass (433 parts)

Styrene-based TPE (hardness: 55°): 15% by mass (100 parts)

Compatibilizer: 5% by mass (5 parts)

Wax (solid paraffin oil): 15% by mass (100 parts)

A resin sheet (width: 1000 mm, and thickness: 0.3 mm) was prepared by using the obtained raw material composition with the extrusion device as described above. A plurality of vertical grooves (width: 0.5 mm, and depth: 0.4 mm) along a longitudinal direction were formed in a surface of the resin sheet. The resin sheet serves as a surface resin layer of the conveyor belt.

Respective layers were compressed during extrusion molding to obtain the conveyor belt of the example. The thickness of the conveyor belt is 2.3 mm.

Comparative Example

A conveyor belt of a comparative example was obtained by using only the core body layer prepared in the above-described example.

The tensile strength and the coefficient of static friction were measured with respect to the conveyor belts of the example and the comparative example. A test method is as follows.

<Tensile Strength>

The tensile strength is obtained in accordance with JIS K6301 (New JIS K6251). The conveyor belts of the example and the comparative example are set to a dumbbell-shaped specimen (No. 3), and are pulled until being fractured at a speed of 500 mm/min by using a tensile tester (manufactured by SHIMADZU CORPORATION) under an environment of a temperature of 23° C. and relative humidity of 50%. The tensile strength is calculated from the maximum tensile force necessary for fracture of the specimen.

<Coefficient of Static Friction>

The coefficient of static friction is measured by a surface property measuring device (manufactured by Shinto Scientific Co., Ltd.). The conveyor belt of the example and the comparative example are used as a specimen having dimensions of 20 mm×30 mm, and a cardboard is used as an object. Each of the specimens is placed on the cardboard, and the specimen is moved at a speed of 5 mm/min while applying a load of 0.8 kPa to obtain the coefficient of static friction.

The tensile strength of the conveyor belt of the example was 4.6 MPa, and the tensile strength of the conveyor belt of the comparative example was 4.8 MPa. Even when the surface resin layer is provided on a surface of the core body layer (conveyor belt of the comparative example), the tensile strength of the core body layer is not damaged, and is maintained to 95% or more. It can be seen that the conveyor belt of the example has sufficient tensile strength.

The coefficient of static friction of the conveyor belt of the example was 0.95, and the coefficient of static friction of the conveyor belt of the comparative example was 0.45. The coefficient of static friction of a surface of the belt of the example is two or more times that of the belt of the comparative example.

5. Modification Example

The invention is not limited to the embodiment described here, and can be appropriately modified in a range not departing from the gist of the invention.

In the above-described embodiment, the unevenness including the plurality of vertical grooves 22 is provided in the entire region of the surface resin layer 20 in the width direction, but there is no limitation thereto. The coefficient of static friction can be increased as long as the unevenness is provided at least at 50% of the conveying surface 21 of the surface resin layer 20 in the width direction.

The plurality of vertical grooves 22 may be formed when preparing the surface resin layer 20. For example, a sheet-shaped material is prepared on release paper by using a raw material composition, and a pressurizing member having a surface shape corresponding to the vertical grooves is disposed on the sheet-shaped material. The sheet-shaped material interposed between the release paper and the pressurizing member is solidified by a typical method.

The release paper is removed, the sheet-shaped material is disposed on the elastic layer 14 in the core body layer 12 that is prepared in advance, thereby obtaining a laminated body. An upper surface of the laminated body serves as a pressurizing member, and a lower surface serves as the stretchable knitted fabric 15. The laminated body is heated and compressed to be processed into a predetermined thickness. For example, the thickness of the laminated body after heating and compression may be set to approximately 1 to 3 mm. When performing heating and compression, the elastic layer 14 in the core body layer 12 and the surface resin layer 20 are fixed to each other, thereby obtaining the conveyor belt of the embodiment.

With regard to the unevenness of the conveying surface 21, a concave part and a convex part can be alternately provided in vertical and horizontal directions. A pitch of the unevenness provided in the vertical and horizontal directions can be set, for example, to approximately 0.5 to 3.0 mm, and the height of the convex part of the unevenness can be set, for example, to approximately 0.2 to 1.0 mm. To provide the unevenness, a canvas for weight processing having a predetermined unevenness may be used when preparing the surface resin layer 20.

Figure 2:
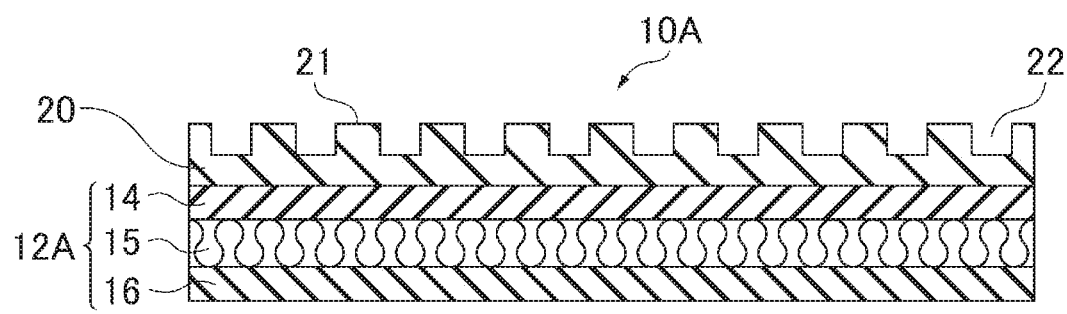
FIG. 2 is a cross-sectional view of a conveyor belt of Modification Example A in a width direction.

In the above-described embodiment, the core body layer 12 is set to a laminated structure of the stretchable knitted fabric 15 and the elastic layer 14, but there is no limitation thereto. For example, as in a core body layer 12A in a conveyor belt 10A in FIG. 2, an additional elastic layer 16 made of a thermoplastic material can be provided on a lower surface of the knitted fabric 15 (Modification Example A). The thermoplastic material used in the additional elastic layer 16 may be the same as or different from the thermoplastic material used in the elastic layer 14.

Figure 3:
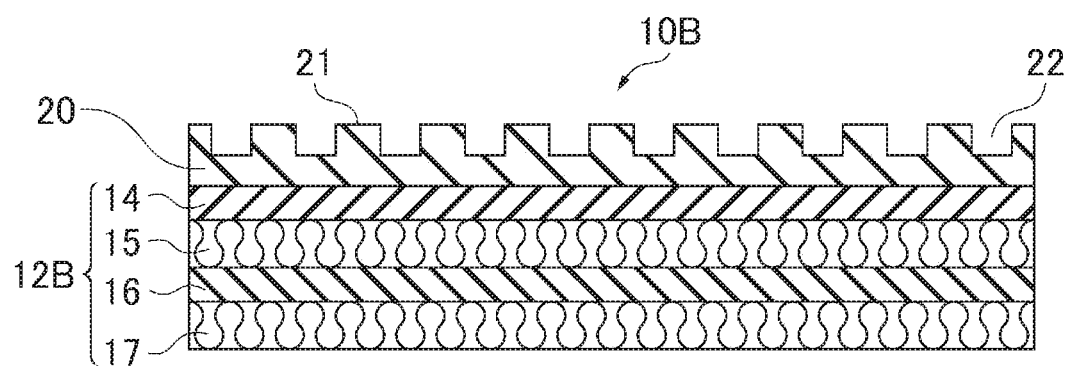
FIG. 3 is a cross-sectional view of a conveyor belt of Modification Example B in a width direction.

As in a core body layer 12B in a conveyor belt 10B in FIG. 3, an additional stretchable knitted fabric 17 may be provided on a lower surface of the additional elastic layer 16 (Modification Example B). Fibers of the additional knitted fabric 17 and a method for knitting the additional knitted fabric 17 may be the same as or different from those in the knitted fabric 15.

The second thermoplastic material is not limited to the mixture of the first thermoplastic material and the additive, and may be a mixture of a thermoplastic material different from the first thermoplastic material and the additive.

REFERENCE SIGNS LIST 10, 10A, 10B Conveyor belt
12, 12A, 12B Core body layer
14 Elastic layer
15 Knitted fabric
16 Additional elastic layer
17 Additional knitted fabric
20 Surface resin layer
21 Conveying surface
22 Vertical groove

The invention claimed is:

1. A conveyor belt comprising:
a stretchable knitted fabric;
an elastic layer that is provided on an upper surface of the knitted fabric and is made of a first thermoplastic material; and
a surface resin layer that is provided on an upper surface of the elastic layer, is made of a second thermoplastic material having hardness lower than hardness of the first thermoplastic material, and the surface resin layer includes a conveying surface having unevenness,
wherein tensile strength of the conveyor belt is 3.5 to 35 MPa, and a coefficient of static friction of the conveying surface is 0.5 to 1.0.

2. The conveyor belt according to claim 1,
wherein the unevenness includes a plurality of vertical grooves along a longitudinal direction of the surface resin layer.

3. The conveyor belt according to claim 1, further comprising:
an additional elastic layer that is made of a thermoplastic material and is provided on a lower surface of the knitted fabric.

4. The conveyor belt according to claim 3, further comprising:
a stretchable additional knitted fabric that is provided on a lower surface of the additional elastic layer.

5. The conveyor belt according to claim 1,
wherein the conveyor belt has an endless shape of which both ends are joined.

\* \* \* \* \*